US008819330B1

(12) United States Patent
Spangler et al.

(10) Patent No.: US 8,819,330 B1
(45) Date of Patent: Aug. 26, 2014

(54) SYSTEM AND METHOD FOR UPDATING A LOCALLY STORED RECOVERY IMAGE (75) Inventors: Randall R. Spangler, San Jose, CA (US); William A. Drewry, Nashville, TN (US); William F. Richardson, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 279 days.

(21) Appl. No.: 13/237,873

(22) Filed: Sep. 20, 2011

(51) Int. Cl.
G06F 12/00 (2006.01)

(52) U.S. Cl.
USPC .......................................................... 711/103

(58) Field of Classification Search
USPC .......................................................... 711/103
See application file for complete search history.

(56) References Cited

U.S. PATENT DOCUMENTS

| 5,951,665 | A * | 9/1999 | Crane et al. .................... 710/306 |
| 6,948,047 | B2 * | 9/2005 | Maruska et al. .................. 712/1 |
| 2003/0028800 | A1 | 2/2003 | Dayan et al. |
| 2004/0076043 | A1 | 4/2004 | Boals et al. |
| 2004/0255106 | A1 | 12/2004 | Rothman et al. |
| 2005/0039076 | A1 | 2/2005 | Shoam |
| 2010/0031244 | A1 | 2/2010 | Koba |
| 2011/0087920 | A1 | 4/2011 | Hendricks et al. |

OTHER PUBLICATIONS

"Host protected area", Wikipedia—the free encyclopedia, Nov. 15, 2011, retrieved from <http://en.wikipedia.org/wiki/Host_protected_area#Use>.

* cited by examiner

Primary Examiner — Mardochee Chery
(74) Attorney, Agent, or Firm — McDermott Will & Emery LLP (57) ABSTRACT

Systems, methods, and machine-readable media for storing a recovery image on a secondary memory device on a computing system and updating the recovery image. In some aspects, the system may include a main storage device comprising an operating system, a secondary storage device, internal to the computer system and separate from the main storage device, comprising a recovery image, and a processor configured to determine whether to boot the computer system in a normal mode using the main storage device or in a recovery mode using the recovery image on the secondary storage device. In some aspects, the system may also include a recovery circuit configured to prevent access to the secondary storage device during the normal mode when the recovery circuit is disabled and to permit access to the second storage device when the recovery circuit is enabled during the recovery mode process.

25 Claims, 6 Drawing Sheets

SYSTEM AND METHOD FOR UPDATING A LOCALLY STORED RECOVERY IMAGE

BACKGROUND

The present disclosure generally relates to the recovery of computer system and, in particular, to storing and updating a locally stored recovery image.

Computing devices (e.g., desktop computers, laptops, netbooks, tablets, smart phones, mobile devices, servers, etc.) generally operate using a combination of firmware and software that is configured to execute on the hardware of a given computing device. A given set of firmware and software (e.g., the operating system) that is used to operate a computing device may be referred to as an operating image for the computing device.

Various situations may occur where it is desired to replace or repair a current operating image of a computing device. For example, a user may wish to update the computing device's operating image to the most recent version or the computing device's operating image may become corrupted. Such corruption may be the result of a malicious act. Such malicious acts include modification of a computing device's image to install malicious software or "malware" (e.g., viruses, spyware, password sniffers, etc.). Corruption of an operating image may also occur as a result of other causes. For example, an operating image could become corrupted as a result of an update to the image (e.g., to improve functionality or to enhance security of the computing device) being interrupted due to loss of network connectivity, a power failure, or a number of other factors. In these instances, it is desirable that the corrupted operating image be replaced or repaired with an image that is free of corruption.

A recovery image may be a set of firmware and software that can be used to replace or repair a computing device's operating image. However, restoring an operating image using a recovery image may be a complex, if not a difficult process, and the recovery image itself may also be susceptible to data corruption. Furthermore, an outdated recovery image may contain security vulnerabilities that may be exploited before an update can occur. As a result, maintaining an updated recovery image may be desirable.

SUMMARY

According to one aspect of the subject technology, a system for storing a recovery image on a secondary memory device on a computing system and updating the recovery image is provided. In some aspects, the system may include a main storage device including an operating system, a secondary storage device, internal to the computer system and separate from the main storage device, comprising a recovery image, and a processor configured to determine whether to boot the computer system in a normal mode using the main storage device or in a recovery mode using the recovery image on the secondary storage device. In some aspects, the system may also include a recovery circuit configured to prevent access to the secondary storage device during the normal mode when the recovery circuit is disabled and to permit access to the second storage device when the recovery circuit is enabled during the recovery mode process.

According to another aspect of the subject technology, a method for updating a recovery image on a secondary storage device internal to a computer system is provided. The method may include detecting a recovery image update indication, enabling, based on the detected recovery image update indication, a recovery circuit to permit writing to the secondary storage device internal to the computer system, the secondary storage device storing the recovery image, and updating the recovery image on the secondary storage device using the recovery image update.

According to yet another aspect of the subject technology, a machine-readable medium including instructions stored therein, which when executed by a machine, cause the machine to perform operations for updating a recovery image on a secondary storage device internal to a computer system is provided. Operations may include detecting a recovery update indication, permitting access, based on the detected recovery update indication, to a secondary storage device storing a recovery image by enabling a recovery circuit, the secondary storage device internal to the machine, and updating the recovery image on the secondary storage device using the recovery image update.

According to another aspect of the subject technology, a method for updating a recovery image on a secondary storage device internal to a computer system is provided. The method may include receiving an image update over a network, updating an operating image of the system using the image update, determining whether the image update is stable by performing at least one test on the updated operating image, setting a recovery image update indication if the image update is stable, and rebooting the system.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In accordance with various aspects of the subject technology, systems and methods for storing a recovery image on a secondary memory device on a computing system and updating the recovery image when appropriate. The secondary memory device may be internal to the computer system and separate from a main storage device that stores the operating system. Providing the recovery image on a secondary memory device on the computing system provides protection to the recovery image from sources of corruption directed towards the main storage device. Furthermore, a user does not need create and install a external recovery device (e.g., a compact disc (CD), a thumb drive, or other external storage device) that contains the recovery image. By updating the recovery image, the user does not need to locate the external recovery device and manually update it whenever an update is available.

In accordance with some aspects, access to the secondary memory device may be restricted in order to prevent corruption or (intentional or accidental) alteration of the recovery image. For example, a system may include a recovery circuit to enable or disable writing to the secondary storage device. The recovery circuit may be controlled by instructions in read-only firmware code that is executed during boot time and cannot be altered by the operating system, programs, hackers, or other firmware code.

Figure 1:
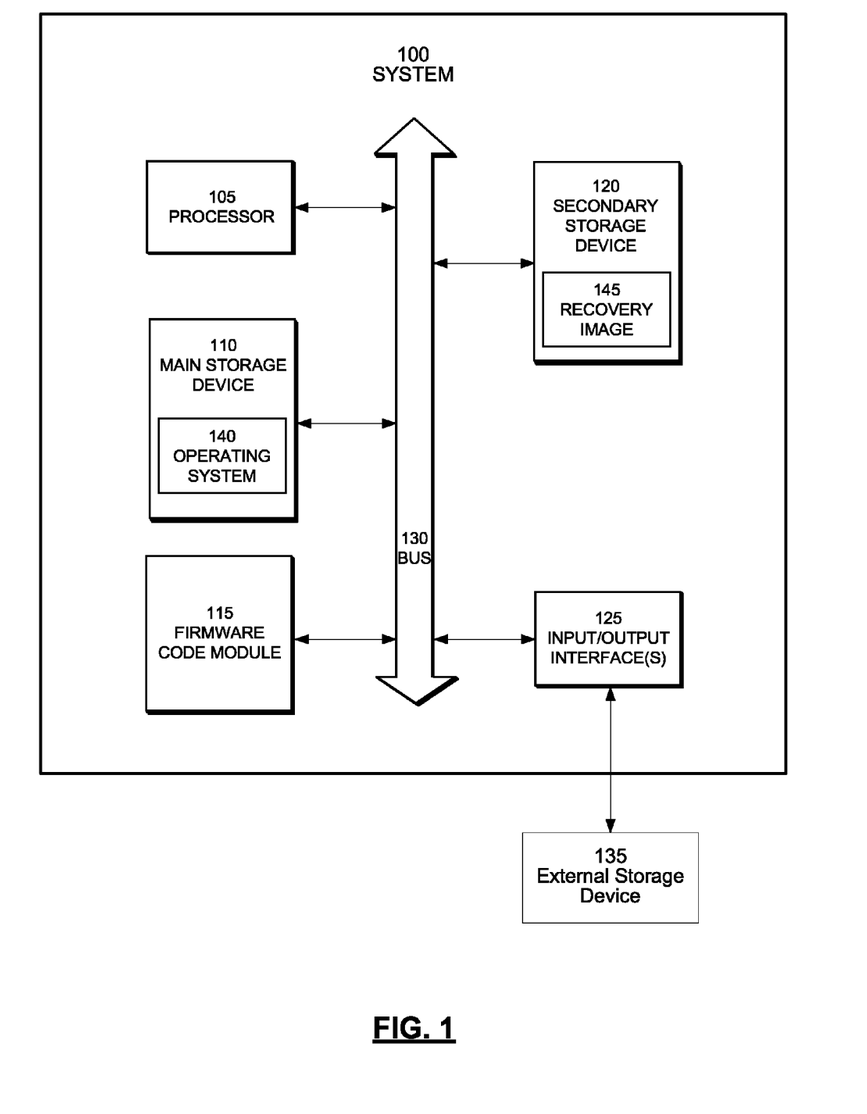
FIG. 1 is a block diagram illustrating a computer system for storing a recovery image, in accordance with various aspects of the subject technology.

FIG. 1 is a block diagram illustrating a computer system 100 for storing a recovery image, in accordance with various aspects of the subject technology. The computer system 100 may include a processor 105, a main storage device 110, a firmware code module 115, a secondary storage device 120, and one or more input/output interfaces 125 which may communicate with one another via a bus 130.

The one or more input/output interfaces 125 may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker). One or more input/output interfaces 125 may also be configured to communicate with an external storage device 135. For example, the external storage device 135 may be a removable data storage device such as a universal serial bus (USB) drive or a secure digital (SD) card, and the interface 125 may be, respectively, a USB data port or a SD card reader. The external storage device 125 and the interface 125 may also take other forms (e.g., an external hard drive).

The processor 105 may be configured to control the various elements of the computer system 100 and perform various tasks by executing machine-readable instructions that are stored in the main storage device 110, the firmware code module 115, the secondary storage device 120, or the external storage device 135. The main storage device 110 may include cache memory, random access memory, or one or more hard drives. As shown in FIG. 1, the main memory device may contain a root file system that includes an instance of an operating system 140 for the computer system 100.

The firmware code module 115 may include instructions that may be executed by the processor 105 when booting the computer system 100. The instructions stored in the firmware code module 115 (e.g., the boot stub) may direct the processor 105 to initiate a boot process and execute instructions that are stored in the main storage device 110 (e.g., instructions to initiate the operating system on the main storage device 110). In other instances, the instructions in the firmware code module 115 may be configured to determine whether to execute a recovery mode procedure on the system 100. If a recovery mode procedure is to be executed, the instructions in the firmware code module 115 may instruct the processor 105 to load and execute instructions that are stored on the secondary storage device 115.

The firmware code module 115 may be organized such that it includes a write-protected region and a writeable region. The write-protected region may have been written during the manufacture of the system 100 and locked to protect the code from being erased or altered. The write-protected region may include the instructions for determining whether a normal boot mode should be executed or a recovery mode procedure should be executed. The write-protected region may also include instructions for initiating the normal boot mode or the recovery mode procedure for the computing device. The writeable region of the firmware may include instructions for initiating system components or executing a portion of the boot or recovery process.

Recovery mode procedures may include, for example, restoring operating image of the computer system 100 (e.g., in the firmware 115 and/or the main storage device 110) to a known and trusted state or updating a recovery image. Restoring an operating image may include copying machine-readable instructions that are digitally signed by a trusted supplier from the secondary storage device 120 (e.g., the recovery image 145) and storing the signed instructions in the firmware 115 and/or the main storage device 110.

The secondary storage device 120 that contains the recovery image 145 may be an internal memory card (e.g., a secure digital (SD) card or other flash card) that is located within the housing of the device. For example, the memory card and the memory card slot that interfaces with the memory card may be located within the computer case or inside the battery compartment of a laptop or mobile device. The recovery image 145 on the memory card may be updated by removing it and programming it on a different computer system or inserting the memory card into another card slot on the computer system 100 (e.g., on the outside of the computer system 100). In some aspects, the memory card may be updated by the memory card slot within the housing of the device. The secondary storage device 120 may also be a non-removable internal memory chip (e.g., an embedded multimedia card (eMMC), an electrically erasable programmable read-only memory (EEPROM), a NAND flash memory, etc.) located inside the device.

Figure 2:
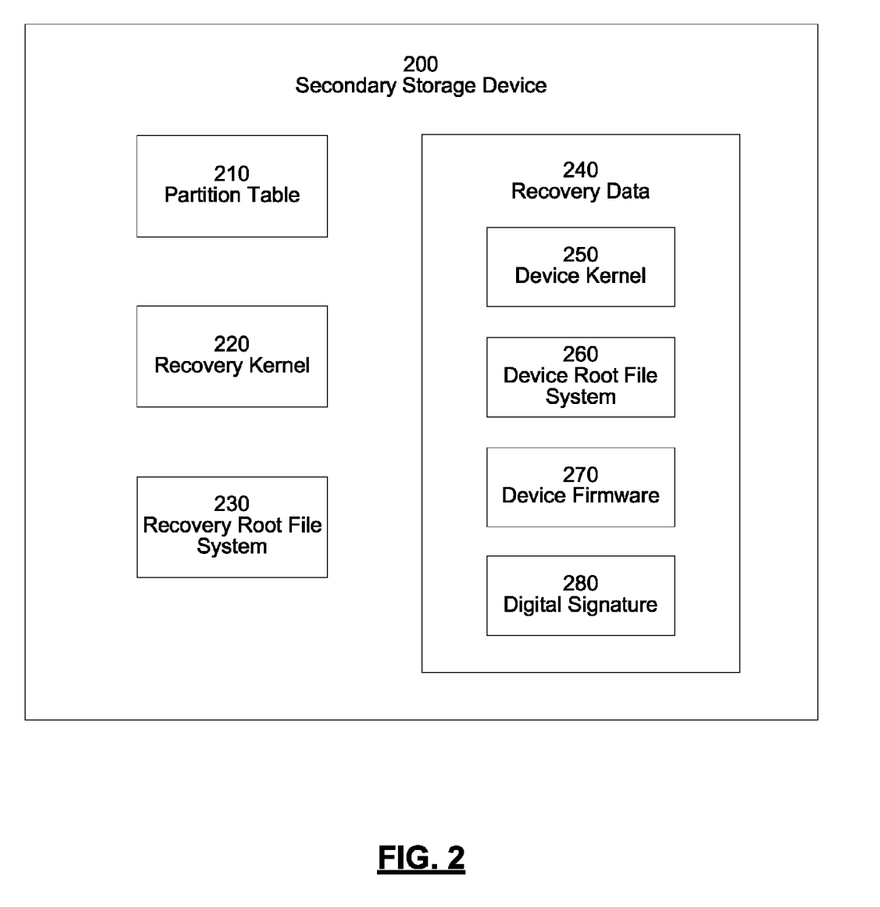
FIG. 2 is a block diagram illustrating a secondary storage device containing a recovery image in accordance with some aspects of the subject technology.

FIG. 2 is a block diagram illustrating a secondary storage device 200 containing a recovery image in accordance with some aspects of the subject technology. As shown in FIG. 2, the secondary storage device 200 includes a partition table 210, a recovery kernel 220 and a recovery root file system 230 for use as an operating environment during execution of a recovery mode procedure. The secondary storage device 200 also includes recovery data 240. The recovery data 240 includes a device kernel 250, a device root file system 260 and device firmware 270 for the computing device on which a recovery mode procedure is being executed.

As shown in FIG. 2, the recovery data 240 may also include a digital signature 280 that may be used by a computing device to verify that the recovery image stored on the secondary storage device 200 is from a trusted or reliable source. For instance, a cryptographic key stored in a boot stub of the computing device may be used to verify the digital signature 280 based on a message digest (e.g., hash) of one or more portions of the recovery data 240.

When a recovery mode procedure is to be executed, the computer system 100 may verify that the recovery image containing the recovery data 240 is from a trustworthy source (e.g., the digital signature 280 matches the message digest) and if verified, the system 100 may then continue to execute the recovery mode procedure using the recovery data 240 to repair or replace a current operating image of the system 100.

Figure 3:
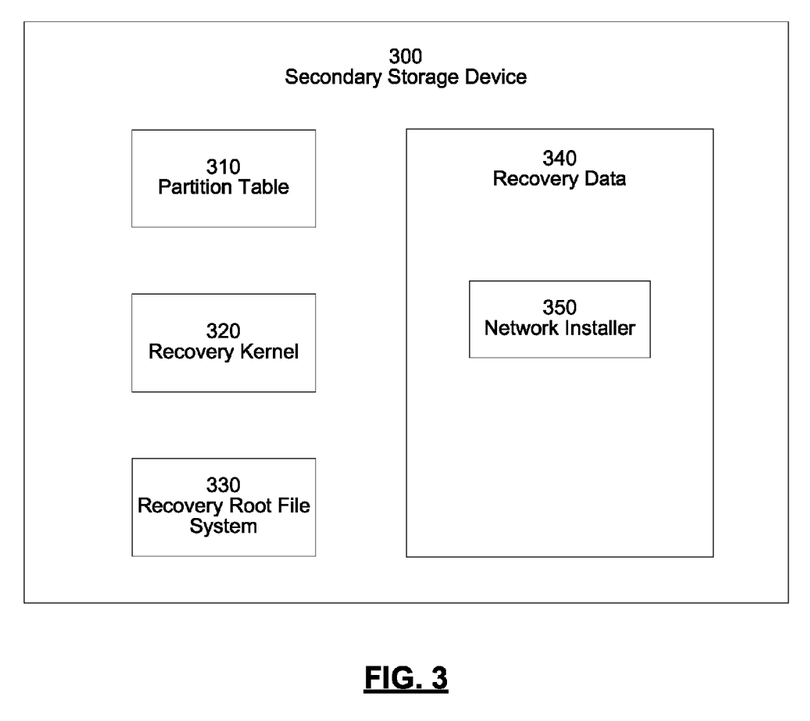
FIG. 3 is a block diagram illustrating a secondary storage device containing another recovery image in accordance with some aspects of the subject technology.

FIG. 3 is a block diagram illustrating a secondary storage device 300 containing another recovery image in accordance with some aspects of the subject technology. As shown in FIG. 3, the secondary storage device 300 may include a partition table 310, a recovery kernel 320 and a recovery root file system 330 for use as an operating environment during execution of a recovery mode procedure, such as in similar fashion as the recovery image illustrated in FIG. 3.

The recovery device 300 may also contain recovery data 340 that includes a network installer 350. In such an approach, the network installer 350 may be used by a computing device to initialize a network interface and use the network interface to obtain a recovery image from the server. The obtained recovery image may contain a device kernel, a device root file system, device firmware and a digital signature, which may then be used during a recovery mode procedure in similar fashion as the device kernel 250, the device root file system 260, the device firmware 270 and the digital signature 280 of FIG. 2.

In an example approach, the recovery data 340 may also include another digital signature that is based on the network installer information 350. In such an arrangement, the network installer digital signature may be used to verify that the network installer 350 of the recovery image illustrated in FIG. 3 is from a trustworthy source, such as a supplier of the computing system on which the corresponding recovery mode procedure is being executed.

In another aspect, a system's secondary storage device may contain both a full recovery image and a network installer. During a recovery process, the system may connect to a server to determine if a recovery image newer than the recovery image on the secondary storage device is available. If a newer version is available, the system may download the newer recovery image and use it to repair or replace the current operating image. If no newer recovery image is available or if the server is not available, the recovery image stored on the secondary storage device may be used to repair or replace the operating image of the system.

According to various aspects of the subject technology the recovery image stored on the secondary storage device may be updated in an effort to provide an up-to-date recovery image for the system. An up-to-date recovery image enables a user to recover a computer system to an up-to-date operating image instead of recovering using an old image and needing to apply one or more updates to the operating image. Having an old operating image also presents certain risks. For example, an outdated operating image may contain security vulnerabilities that may be exploited before an update can occur.

An update to the recovery image may be obtained from a server via a network (e.g., internet) connection or from data stored on an external storage device (e.g., a compact disc (CD), a USB drive, etc.). However, in some aspects, before the recovery image is updated, the system may first confirm that the update is functional. Otherwise the system may update the recovery image with a non-functional image and when the system needs to run one or more recovery mode procedures using the recovery image, the recovery mode or the recovery mode procedures may not operate correctly.

To confirm that the update is functional, an update module of the system may first apply the update to the operating image (e.g., the set of firmware and software, including the operating system, being used to operate the system). The system may then boot up in the updated operating image and the update module may be configured to run a number of tests to determine whether the updated operating image is functional.

For example, the update module may determine if the system has contacted or is able to contact an update server over a network. This ensures that the updated operating image is capable of updating itself further if necessary. To ensure that the updated operating image is stable, the update module may also determine if the system has been operating continuously for a predetermined time period (e.g., a predetermined number of minutes) or has been booted up a predetermined number of times. Additional tests (e.g., network connectivity, disk access, etc.) may also be run before updating the recovery image. Once the update module confirms that the update is functional based on one or more of the tests, the update module may proceed with updating the recovery image stored on the secondary device.

In some aspects, access to the recovery image on the secondary storage device may be restricted in order to prevent corruption or (intentional or accidental) alteration of the recovery image by, for example, a system's operating system, an application, a remote hacker, or the user of the system. To restrict access to the secondary storage device, some aspects may provide a system that includes a recovery circuit to enable or disable writing to the secondary storage device.

Although some memory devices (e.g., SD memory cards) may contain write-protect switches, the write-protect switches may be enforced by the operating system of the system and the operating system. Typically the operating system enables access to the secondary storage device in a manner consistent with the write-protect switches, however, the operating system may ignore the write-protect switch for a number of reasons (e.g., if altered by a hacker or malicious program).

The recovery circuit may address this vulnerability by preventing the operating system or other program from writing to the secondary storage device. Enforcement of whether or not the secondary storage device is writable may be controlled by instructions in read-only firmware code (e.g., the boot stub firmware) that cannot be altered by the operating system, programs, hackers, or other firmware code. In some aspects, the read-only firmware code controlling access to the secondary storage device is only executed when a system turns on or resets. As a result, access control to the secondary storage device may only be altered when the system turns on or resets.

Figure 4:
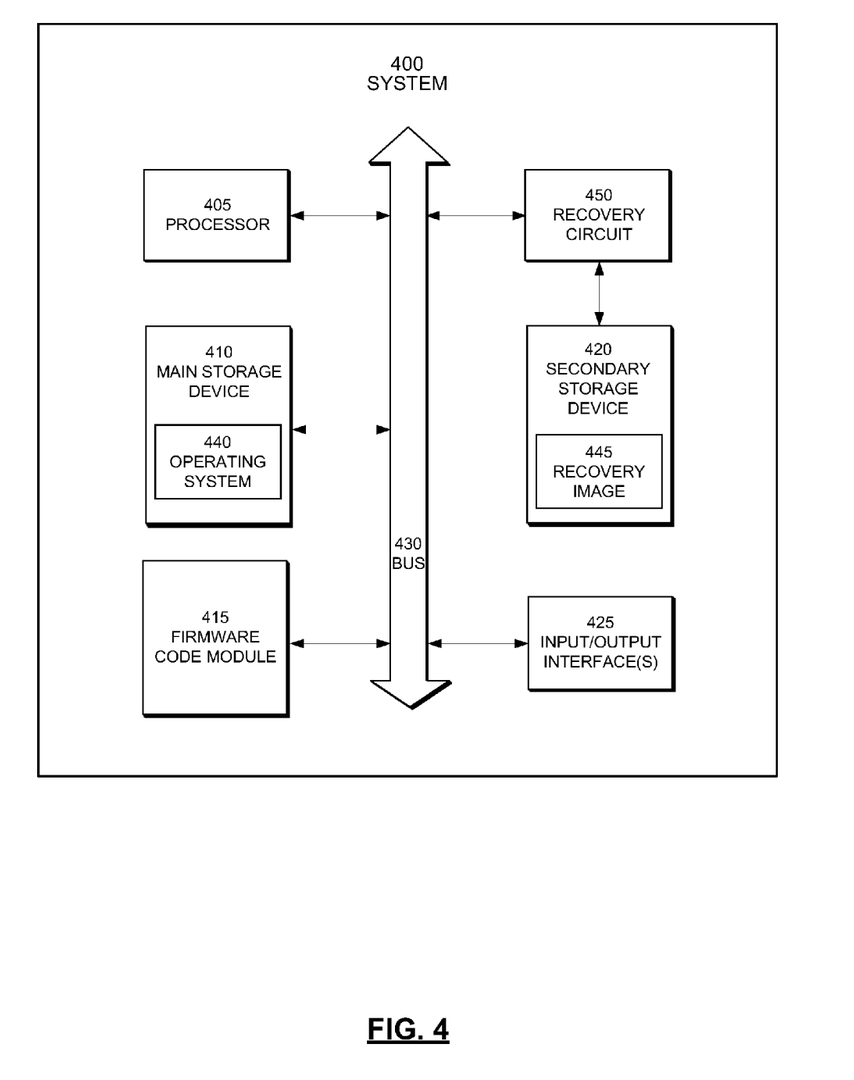
FIG. 4 is a block diagram illustrating a computer system for storing a recovery image that includes a recovery circuit, in accordance with various aspects of the subject technology.

FIG. 4 is a block diagram illustrating a computer system 400 for storing a recovery image that includes a recovery circuit 450, in accordance with various aspects of the subject technology. The computer system 400 may include a processor 405, a main storage device 410 containing an operating system 440, a firmware code module 415, a secondary storage device 420 containing a recovery image 445, and one or more input/output interfaces 425 which may communicate with one another via a bus 430.

The system 400 may also include a recovery circuit 450 that prevents the secondary storage device 420 from being written to. In some aspects, the recovery circuit 450 is enabled or disabled by a read-only portion of the firmware code module 415. The read-only portion of the firmware code module 415 may contain instructions that allow writing to secondary storage device 420 (e.g., enable a recovery circuit 450) only when the system is in a recovery mode to perform a recovery procedure. During other operational modes (e.g., while running the operating system or normal mode) the secondary storage device 420 may be electronically disconnected from the rest of the system or the write-to capabilities of the secondary storage device 420 may be disabled.

Figure 5:
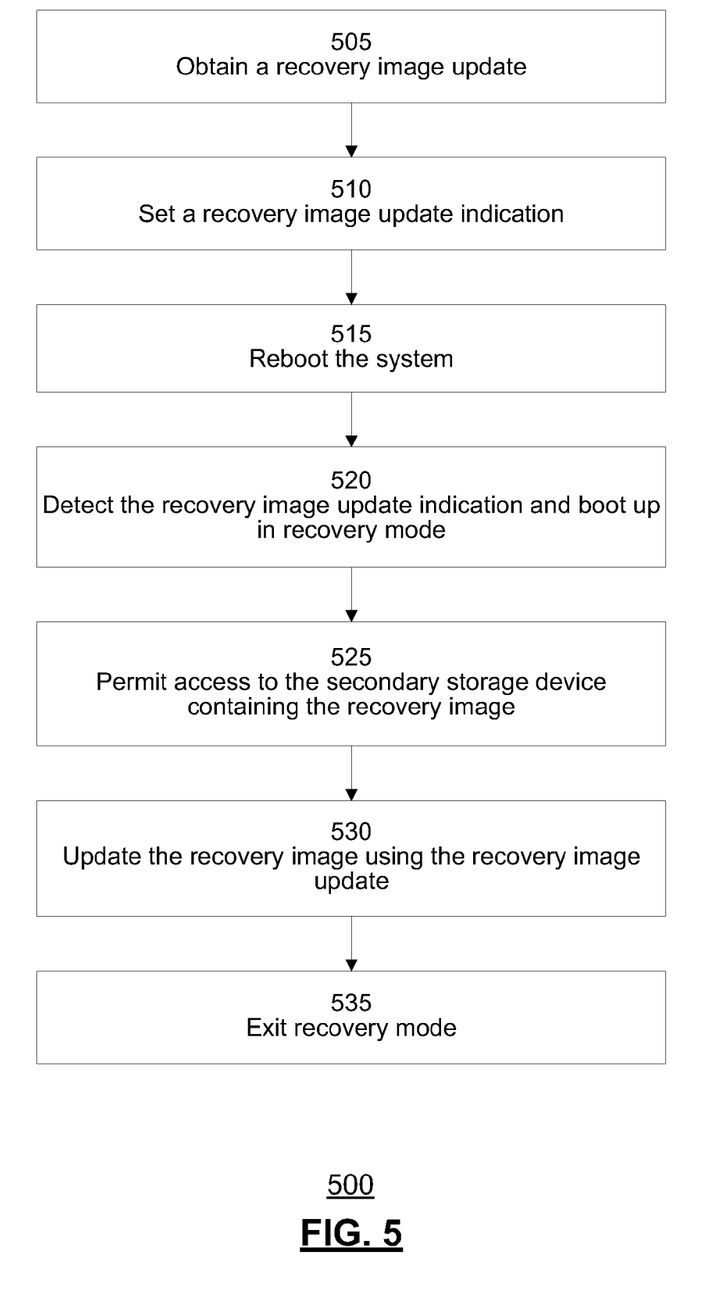
FIG. 5 is a flow chart illustrating a process for updating a recovery image on a secondary storage device according to various aspects of the subject technology.

FIG. 5 is a flow chart illustrating a process 500 for updating a recovery image on a secondary storage device according to various aspects of the subject technology. The process 500 begins at operation 505, when an input/output interface 425 (e.g., a network interface) system obtains a recovery image update (e.g., a new recovery image). The recovery image update may be obtained from a update server over a network (e.g., the internet) and stored at an assigned location on the system (e.g., on the main storage device 410). Once the recovery image update is obtained, at operation 510 the operating system 440 may set a flag or some other recovery image update indication in the writable portion of the firmware code module 415 indicating that an update to the recovery image is available. In some aspects, as described above, an update module may confirm that the update is functional before the indication is set.

The system 400 may then wait until the next boot process begins. For example, at operation 515, the operating system 440 may automatically reboot the system 400 when an update to the recovery image is obtained, a user may reset the system 400, or the system 400 may be shut off and booted up the next time the system 400 is turned on. When the system 400 is booted up, the read-only portion of the firmware code module 415 may execute and detect the recovery image update indication at operation 520.

Based on the detected recovery image update indication, the read-only portion of the firmware code module 415 may begin booting up the system into a recovery mode and, at operation 525, permit access to the secondary storage device 420 containing the recovery image 445. The firmware code module 415 may permit access to the secondary storage device 420 by, for example, enabling a recovery circuit 450 that electrically connects the secondary storage device 420 to the system. In another aspect, the recovery circuit 450 may be configured to control write access to the secondary storage device 420.

Once the secondary storage device 420 is able to be written to, the system 400 may update the recovery image 445 on the secondary storage device 420 using the recovery image update at operation 530. After the update is complete, at operation 535, the system may remove the recovery image update indication and exit recovery mode by, for example, shutting off or resetting. The next time the system 400 boots up, the system may boot up in a normal mode with an updated recovery image 445 on the secondary storage device 420.

In some aspects, before the recovery image 445 is updated using the recovery image update, the recovery image update may be verified. For example, the system may use a cryptographic key stored in a boot stub of the computing device to verify a digital signature associated with the recovery image update. If the recovery image update is verified, the system may then update the recovery image with the recovery image update.

Figure 6:
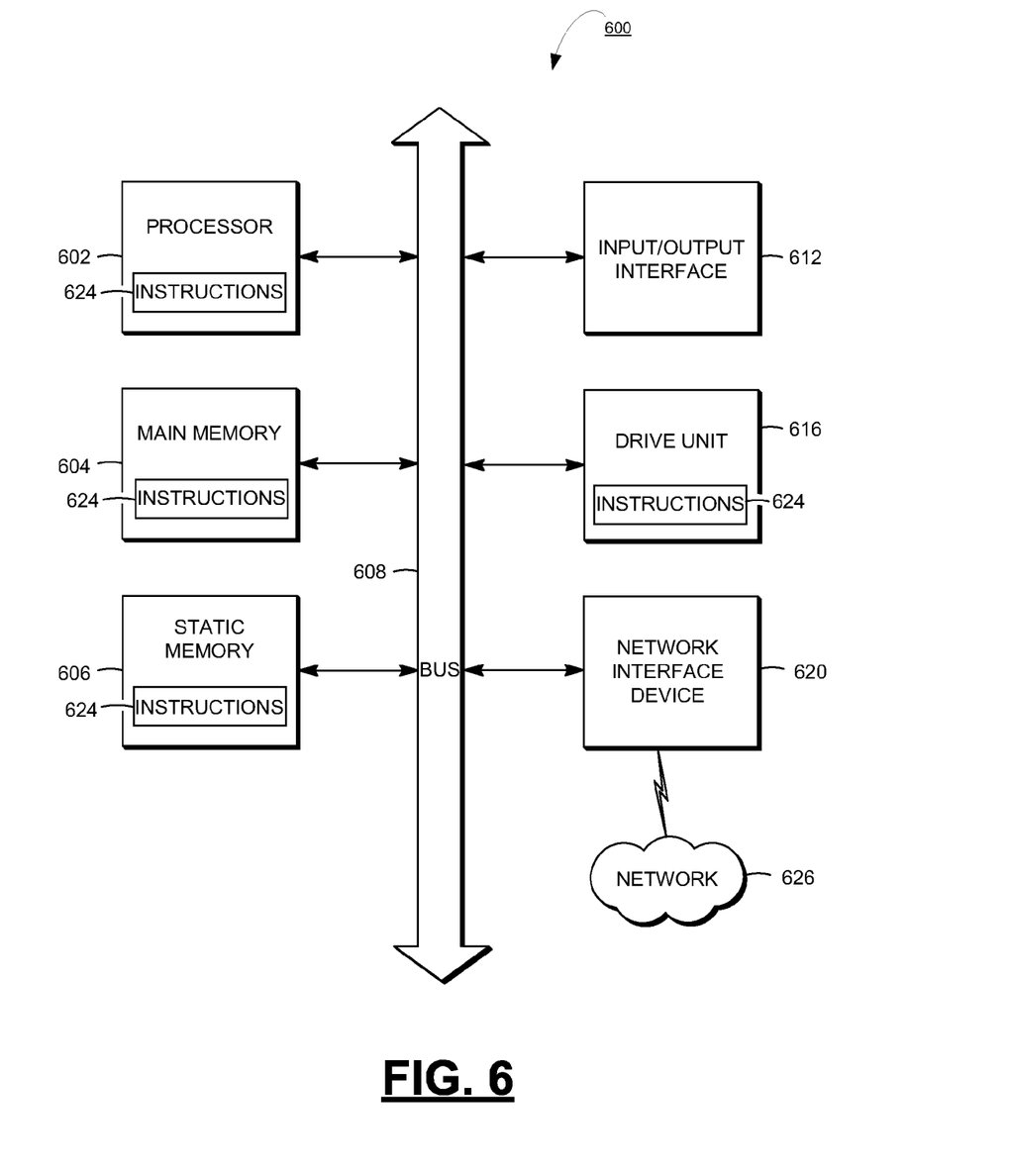
FIG. 6 is a block diagram illustrating a computer system with which any of the aspects described herein may be implemented.

FIG. 6 is a block diagram illustrating a computer system with which any of the aspects described herein may be implemented. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the aspects discussed herein. The term "machine-readable medium" shall accordingly be taken to include, but not be limited to, storage mediums such as solid-state memories, optical media, and magnetic media.

Systems, methods, and machine-readable media for storing a recovery image on a secondary memory device on a computing system and updating the recovery image when appropriate. The secondary memory device may be internal to the computer system and separate from a main storage device that stores the operating system. In accordance with some aspects, access to the secondary memory device may be restricted in order to prevent corruption or (intentional or accidental) alteration of the recovery image. For example, a system may include a recovery circuit to enable or disable writing to the secondary storage device. The recovery circuit may be controlled by instructions in read-only firmware code that cannot be altered by the operating system, programs, hackers, or other firmware code.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" may be used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer system comprising:
    a housing for the computer system;
    a main storage device, located within the housing for the computer system, comprising an operating system;
    a secondary storage device, located within the housing for the computer system and separate from the main storage device, comprising a recovery image;
    a processor configured to determine whether to boot the computer system in a normal mode using the main storage device or in a recovery mode using the recovery image on the secondary storage device; and
    a recovery circuit configured to prevent access to the secondary storage device when the computer system is not booted in the recovery mode.

2. The computer system of claim 1, wherein the recovery circuit is further configured to prevent access to the secondary storage device during the normal mode when the recovery circuit is disabled and is further configured to permit access to the second storage device when the recovery circuit is enabled during the recovery mode process.

3. The computer system of claim 1, wherein the recovery circuit is configured to prevent access to the secondary storage device by electronically disconnecting the secondary storage device from the computer system.

4. The computer system of claim 1, wherein the recovery circuit is configured to prevent access to the secondary storage device by disabling the ability to write from the computer system to the secondary storage device.

5. The computer system of claim 2, wherein the recovery circuit is enabled by a read-only portion of a firmware code module.

6. The computer system of claim 1, wherein the processor is further configured to update the recovery image.

7. The computer system of claim 6, wherein updating the recovery image on the secondary storage device comprises:
    obtaining a recovery image update;
    setting a recovery image update indication;
    rebooting the computer system into a recovery mode based on the recovery mode update indication;
    permitting access to the secondary storage device; and
    updating the recovery image on the secondary storage device using the recovery image update.

8. The computer system of claim 1, wherein the secondary storage device comprises a non-removable memory chip.

9. The computer system of claim 8, wherein the non-removable memory chip comprises at least one of an embedded multimedia card (eMMC), an electrically erasable programmable read-only memory (EEPROM), a NAND flash, a NOR flash, a solid-state drive, and a non-erasable read-only memory (ROM).

10. The computer system of claim 1, wherein the secondary storage device comprises a memory card.

11. A method for updating a recovery image on a secondary storage device internal to a computer system, the method comprising:
    detecting a recovery image update indication;
    enabling, based on the detected recovery image update indication, a recovery circuit to permit writing to the secondary storage device located within a housing for the computer system, the secondary storage device storing the recovery image; and
    updating the recovery image on the secondary storage device using the recovery image update, wherein the recovery circuit is configured to prevent access to the secondary storage device when the recovery image update indication does not indicate the computer system is booted in a recovery mode.

12. The method of claim 11, wherein the recovery image update indication is detected in a writable portion of a firmware code module.

13. The method of claim 11, further comprising removing the recovery image update indication and rebooting the computer system.

14. The method of claim 11, further comprising verifying the recovery image update using a cryptographic key.

15. The method of claim 11, wherein the recovery circuit is configured to prevent access to the secondary storage device by electronically disconnecting the secondary storage device from the computer system.

16. The method of claim 11, wherein the recovery circuit is enabled by a read-only portion of a firmware code module.

17. The method of claim 11, wherein the secondary storage device comprises a non-removable memory chip.

18. The method of claim 11, wherein the secondary storage device comprises a memory card.

19. A machine-readable medium comprising instructions stored therein, which when executed by a machine, cause the machine to perform operations comprising:
   detecting a recovery update indication;
   permitting access, based on the detected recovery update indication, to a secondary storage device storing a recovery image by enabling a recovery circuit, the secondary storage device located within the machine; and
   updating the recovery image on the secondary storage device using the recovery image update,
   wherein the recovery circuit is configured to prevent access to the secondary storage device when the recovery update indication does not indicate the machine is booted in a recovery mode.

20. The machine-readable medium of claim 19, further comprising verifying the recovery image update using a cryptographic key.

21. The machine-readable medium of claim 19, wherein the recovery circuit is configured to prevent access to the secondary storage device by electronically disconnecting the secondary storage device from the computer system.

22. A method for updating a recovery image on a secondary storage device within a housing for a system, the method comprising:
   receiving an image update over a network;
   updating an operating image of the system using the image update;
   determining whether the image update is stable by performing at least one test on the updated operating image;
   setting, if the image update is stable, a recovery image update indication for updating a recovery image on a secondary storage device within the housing for system; and
   rebooting the system,
   wherein a recovery circuit is configured to prevent access to the secondary storage device when the recovery image update indication does not indicate the system is booted in a recovery mode.

23. The method of claim 22, wherein the at least one test comprises at least one of:
   determining whether the system is able to contact an update server over the network;
   determining if the system has operated continuously for a predetermined time period; and
   determining if the system has rebooted a predetermined number of times.

24. The method of claim 22, wherein the recovery image update indication is set in a writable portion of a firmware code module.

25. The method of claim 22, further comprising:
   after rebooting the system, detecting the recovery image update indication;
   enabling, based on the detected recovery image update indication, writing to the secondary storage device internal to the computer system, the secondary storage device storing the recovery image; and
   updating the recovery image on the secondary storage device using the image update.

* * * * *